United States Patent [19]

Mallon et al.

[11] 4,410,871
[45] Oct. 18, 1983

[54] SEMICONDUCTOR TRANSDUCERS EMPLOYING ION IMPLANTATION TERMINAL CONFIGURATIONS

[75] Inventors: Joseph R. Mallon, Franklin Lakes; Anthony D. Kurtz, Englewood, both of N.J.

[73] Assignee: Kulite Semiconductor Products, Ridgefield, N.J.

[21] Appl. No.: 297,250

[22] Filed: Aug. 28, 1981

[51] Int. Cl.³ ............................................. G01L 1/22
[52] U.S. Cl. .................................... 338/5; 338/4; 357/26
[58] Field of Search ................... 338/2, 4, 5; 357/26, 357/91; 73/727

[56] References Cited

U.S. PATENT DOCUMENTS 3,873,956  3/1975  Kurtz ............................... 338/4 X Primary Examiner—C. L. Albritton
Attorney, Agent, or Firm—Arthur L. Plevy

[57] ABSTRACT

There is disclosed a semiconductor pressure transducer which employs a piezoresistive array fabricated on the surface of a thin substrate member and having the piezoresistors coupled to metallic contacts via ion implanted terminal leads.

10 Claims, 3 Drawing Figures

SEMICONDUCTOR TRANSDUCERS EMPLOYING ION IMPLANTATION TERMINAL CONFIGURATIONS

BACKGROUND OF THE INVENTION

This invention relates to semiconductor transducers of the type employing piezoresistive sensing elements and more particularly to a transducer structure which employs terminal areas which are fabricated by the implantation of ions.

The semiconductor pressure transducer is a well known device used for sensing pressure or force in a variety of applications. A great many transducers employ pizoresistive devices which in general exhibit a change in resistance proportional to the magnitude of an applied force. The prior art depicts a great number of transducer arrangements which are amenable to mass production techniques as the devices are fabricated by conventional integrated circuit operations. In order to provide a final transducer component, one usually secures the semiconductor transducer which includes a deflecting diaphragm to a suitable housing. In this manner, the housing serves as a support for the diaphragm and furthermore enables the mounting of leads associated with the sensing elements mounted on the diaphragm to enable one to monitor a pressure or force in an environment. The prior art, cognizant of such problems, has proposed many alternate ways of mounting the diaphragm assembly to the housing.

A particularly advantageous technique is described in U.S. Pat. No. 3,654,579 entitled ELECTROMECHANICAL TRANSDUCERS AND HOUSINGS issued on Apr. 4, 1972 to A. D. Kurtz et al. This patent generally discusses the technique of fabricating an integral silicon diaphragm which includes piezoresistive devices as the force responsive elements. The diaphragm is secured to a housing having slotted sidewalls to enable one to direct leads through the sidewalls in order to obtain a minimum of interference from the leads during diaphragm operation. Hence, in such applications, a portion of the diaphragm which readily deflects when a force is applied thereto is designated as the active region, while the portion of the diaphragm that does not deflect readily is designated as the nonactive region. In order to provide a good seal between the diaphragm and the housing, one must be assured that there is an intimate coupling between the periphery of the housing and the diaphragm. The seal between the diaphragm and the housing should be leak-free to prevent deleterious substances which may be present in the environment from attacking or otherwise interfering with the terminals and sensor components. Furthermore, the nature of the seal specifies that the transducer assembly possesses a surface which is continuous as defined by the surfaces of the diaphragm to be coupled to the housing. Hence, the prior art understands that this surface must present a flat bondable surface to avoid any ridges or flaws which will effect the quality of the seal between the transducer and housing.

In particular, a most efficient and desirable way of protecting transducer elements including the sensors as well as the diaphragm is the technique of covering the piezoresistive elements or other surfaces of the diaphragm with a thin layer of silicon dioxide, which layer serves to protect the disk or diaphragm against deleterious agents present in the force transmitting environment. This can be accomplished by many techniques and provides transducers which are adequately protected and extremely suitable. See U.S. Pat. No. 3,753,196 issued on Aug. 14, 1973 to Kurtz et al entitled TRANSDUCERS EMPLOYING INTEGRAL PROTECTIVE COATINGS AND SUPPORTS. This patent shows certain techniques pertinent to the above.

As indicated, there remains the problem of bonding the diaphragm structure to the housing to form a final transducer assembly. In order to accomplish this, one must be assured that the terminals associated with the transducer structure do not interfere with transducer operation. In coating such transducer with layers of silicon dioxide, one may encounter a problem in regard to the rate of growth of silicon dioxide. For instance it is known that silicon dioxide grows faster on highly doped surfaces than on lightly doped surfaces. Hence, in certin of these structures, a step may be formed during the fabrication process in the clamping region or the nonactive region of the diaphragm. Such a step operates to prevent the formation of a proper seal and one may experience difficulties in attempting to bond such a diaphragm to a suitable housing. This problem is depicted and solved by suitable structure shown in U.S. Pat. No. 3,873,956 entitled INTEGRATED TRANSDUCER ASSEMBLIES issued on Mar. 25, 1975 to A. D. Kurtz, et al. Techniques of fabricating such devices to compensate for the step in the fabrication process are shown in U.S. Pat. No. 3,935,634 entitled METHODS OF FABRICATING INTEGRATED TRANSDUCER ASSEMBLIES issued on Feb. 3, 1976 to A. D. Kurtz, et al.

In any event, consistent with such efforts, the prior art has further sought to develop an improved transducer assembly which will provide flat bondable areas to enable hermetic coupling to a suitable housing. An alternate technique is depicted in U.S. Pat. No. 4,202,217 entitled SEMICONDUCTOR TRANSDUCER EMPLOYING FLAT BONDABLE SURFACES WITH BURIED CONTACT AREAS issued on May 13, 1980.

U.S. Pat. No. 4,208,782 issued on July 24, 1980 entitled METHODS OF FABRICATING TRANSDUCERS EMPLOYING FLAT BONDABLE SURFACES WITH BURIED CONTACT AREAS depicts the technique for fabricating the transducers as disclosed in the above noted patent. In such techniques, a semiconductor pressure transducer includes a base member fabricated from a given conductivity of silicon. The base member has a central depression defining an active area. Diffused in a top surface is at least one contact area which is directed from the active region towards the periphery of the base member. A piezoresistive sensor is located on this surface in contact with the contact area and within the active region. A layer of epitaxial material surrounds the active region and has an aperture on the surface which is in communication with the contact area outside the active region. This epitaxial layer is polished at the top surface and a housing is coupled to this region by means of a suitable bond. In conjunction with such techniques, one can employ transducer configurations which are protected from the environment by means of thin layers of silicon dioxide and achieve both the benefits of a protected device together with proper isolation of terminal and contact areas. Such techniques employ additional steps in the fabrication and hence, are relatively difficult to implement.

An alternate approach depicted in the prior art is to provide a stress sensor apparatus which includes a buried sensor pattern which is fabricated on a semiconductor material by means of ion implantation. This technique is depicted in U.S. Pat. No. 4,035,823 entitled STRESS SENSOR APPARATUS issued on July 12, 1977 to J. F. Marshall and assigned to Honeywell, Inc. This patent attempts to characterize transducers which employ silicon dioxide coatings as suffering in regard to operating characteristics. In essence, the patent indicates that the silicon dioxide layer effects the uniformity of the piezoresistors and hence results in difficult problems in providing compensating techniques to such devices. The patent indicates that the layers adversely effect external stresses on the diaphragm, both in regard to temperature and mechanical stresses. In any event, the patent does not correctly characterize the nature of such devices and it is indicated that the silicon dioxide layer, in fact, is an extremely adequate means of protecting the surface of such a device while being extremely stable and, in fact, does not in any way detract from the performance of the transducer.

However, it is still desirable to provide a most optimum transducer configuration, which configuration will enable one to protect the stress sensors and to provide an optimum bonding surface to enable one to secure the transducer and sensor configuration to a suitable housing. It is an object to provide a sensor arrangement, which arrangement is formed on a semiconductor substrate by a conventional integrated circuit technique such as diffusion or epitaxial growth and to couple the sensor configuration to contact terminal areas by means of terminals which are formed beneath the surface of the diaphragm by means of ion implantation. In this manner, one is enabled to provide a flat surface about the periphery of the sensor array to enable one to couple the array at this surface to a suitable housing.

BRIEF DESCRIPTION OF THE PREFERRED EMBODIMENT

A semiconductor transducer for responding to the magnitude of an applied force, comprising a relatively thin diaphragm of a semiconductor material of a given cross section and having located in an active central area piezoresistive sensors which are fabricated integrally with said diaphragm by a diffusion process, terminal areas connected to said piezoresistive sensors and buried within said diaphragm by ion implantation, with said terminal areas extending from said central area towards the periphery of said diaphragm, and an annular housing coupled to said diaphragm with the central aperture of said housing surrounding said active area and with the sidewalls of said housing secured to said diaphragm beneath said terminal areas.

DETAILED DESCRIPTION OF THE INVENTION

Figure 1:
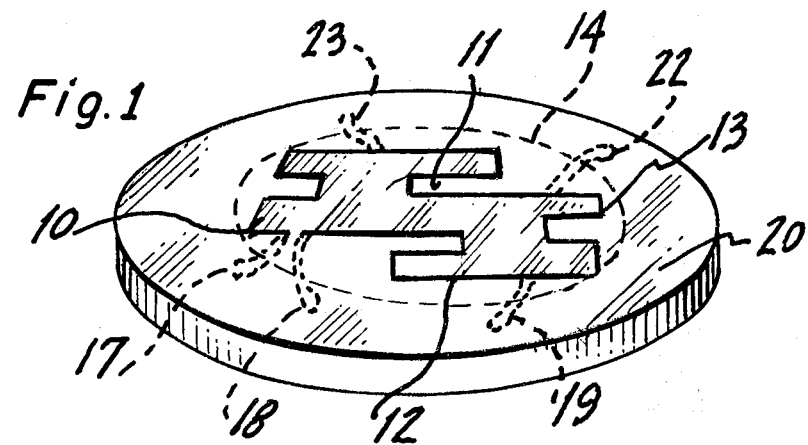
FIG. 1 is a plan view of a piezoresistive semiconductor diaphragm according to this invention.

Referring to FIG. 1, there is shown an integrated silicon diaphragm 20 containing a four active arm Wheatstone bridge which may be utilized as an electromechanical transducer to provide an output proportional to a force or pressure as related to the diaphragm deflection. Basically, the diaphragm consists of a disk of monocrystalline silicon unto which piezoresistive bridge elements 10,11,12 and 13 are atomically bonded using conventional semiconductor techniques or epitaxial growth techniques. As indicated, such bridge configurations have been implemented by conventional semiconductor techniques for many years and hence, are extremely reliable and accurately provided as the techniques have been continuously improved to provide sensor arrangements which are extremely stable and highly accurate. In regard to the fabrication of such structures, reference is had to the above noted patent, U.S. Pat. No. 3,654,579 as well as U.S. Pat. No. 3,930,823 which shows epitaxial techniques for fabricating piezoresistive bridge arrays.

In employing a solid state diffusion technique, the configuration is primarily determined by the use of oxide mask and photolithographic processes. In the diffusion technique, each of the stress sensors 10-13 is isolated from the silicon substrate by the presence of a P-N junction and are arranged on the surface of the silicon membrane or diaphragm 20 so that under the influence of a suitable force, two of the elements are in tension and two are in compression. Overall diameters of typical diaphragms may vary between 0.010 and 0.120 inches. The thickness of the diaphragm 20 determines the rated load and output.

Shown in FIG. 1 is a dashed line 14 enclosing the piezoresistive elements 10 to 13. The area in which the elements are located on the diaphragm is designated as the active area and that is the area which is primarily effected by the application of a force to the diaphragm. The four piezoresistive elements 10-13 are arranged on the surface of the silicon membrane 20 to take primary advantage of the force applied thereto in relation to the semiconductor crystallographic axes.

It is known that in the design of such arrangements, one must be aware of both the longitudinal and transverse piezoresistive coefficients if optimum characteristics are to result. At the center of the diaphragm, both the radial and tangential stresses are equal in magnitude and sign, while towards the periphery, they are not of the same magnitude but are of the same sign. The sress sensors 10-13 are placed on the diaphragm so that under load, two elements are in tension and two are in compression.

Shown in dashed configuration and connected to the piezoresistive array are five terminal areas 17,18,19,22 and 23. These terminal areas, as will be explained, are formed by ion implantation and hence, are located beneath and within the diaphragm to contact the array as shown in FIG. 1 and to extend into the non-active region or the outer peripheral region of the diaphragm beyond the dashed line 14. In this manner, the diaphragm may be bonded to a housing by an electrostatic bonding technique, while assuring that there is provided an extremely flat and bondable surface. The semiconductor diaphragm may be bonded to the housing on the top or the bottom surfaces. A layer of silicon dioxide may be grown over the diaphragm at any desired location to protect the transducer configuration while the layer may be removed from the diaphragm area which is to be bonded.

Figure 2:
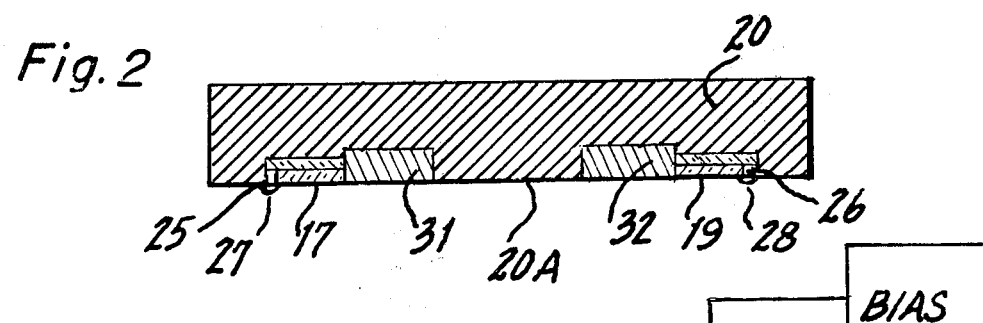
FIG. 2 is a cross sectional view of the diaphragm of FIG. 1.

Referring to FIG. 2, there is shown a cross sectional configuration of the diaphragm of FIG. 1. Essentially, the piezoresistive elements are designated as 31 and 32 and as indicated, can be emplaced on the diaphragm by means of diffusion, epitaxial growth ion implantation or other techniques. The terminal areas as 17 & 19 are formed by an ion implantation technique. In this manner, the terminal areas do not have to behave as resistors but merely serve to direct voltage and current emanating from the bridge to the contacts. By the use of ion implantation, one thereby is able to maintain a highly accurate flat surface to enable bonding of the semiconductor diaphragm to a suitable housing.

In using ion implantation, desired impurities are introduced into the silicon lattice by bombarding the silicon surface with high energy impurity ions. The impurity ions are generated from an ion source and accelerated to energy levels of 50 to 150 keV and are made to impinge on the silicon target in the path of the ion beam. The operation takes place in a vacuum and a mass spectrometer is used to deflect the undesired impurities off the beam. The remaining ion beam is then focussed to a remote area and is scanned across the silicon wafer. The impurity ions which impinge upon the silicon surface penetrate into the lattice. The depth of penetration is fairly shallow and on the order of 0.1 to 1 micron. The depth can be controlled by the choice of target crystal orientation or by beam energy. The surface of the semiconductor to be treated can be masked against implanted ions by coating the treated surface with a metal layer such as aluminum or a thick oxide layer as a mask. In this manner, implanted ions on the silicon surface can follow a typical pattern as a terminal pattern using a photo masking technique.

Ion implantation can be performed at temperatures close to room temperature and does not interfere with the high temperature diffusion cycles. The implementation step is normally done after the diffusion cycles are completed and is followed by a low temperature anneal to remove the structural damage sustained by the silicon lattice during the implantation process. The anneal temperature is typically between 450° to 900° C.

In fabricating terminal areas, one may employ boron implanted P type structures. The resistivity of such structures is inversely proportional to the implementation dose. Hence, by the proper choice of the implantation dose, one may obtain terminal areas such as 17 and 19 which are of extremely low resistance. These areas also exhibit a lower temperaure coefficient than do the diffused resistors. Since the terminals are behaving as mere conductor paths, the resistance characteristics are of no particular consequence as long as the resistivity of the terminal lines is maintained at a relatively low value compared to the resistance of the piezoresistive elements. In this manner, the resistors of the terminal areas may be ten to one hundred times or more less than the resistance of any of the piezoresistors.

Once the terminal areas are deposited, holes such as 25 and 26 are etched or drilled into the semiconductor substrate and filled with a suitable metal such as 27 and 28 during a metallization process to form a contact area. As is known, the surface of the semiconductor 20A is relatively smooth as the substrate is ground to an optical finish.

Figure 3:
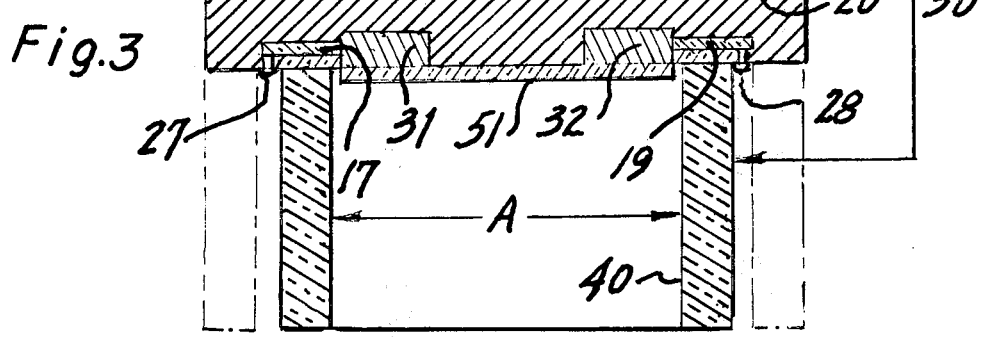
FIG. 3 is a cross sectional view depicting a diaphragm secured to a housing.

Referring to FIG. 3, one may now bond the diaphragm to an annular glass housing 40 by means of an electrostatic bond. Since the terminal areas 17 and 19 are fabricated by ion implantation, they do not effect the bonding area or the bonding surface and hence, the surface is maintained relatively smooth. In order to bond the housing 40 to the semiconductor structure 20 an electrostatic technique is employed. This technique is described in U.S. Pat. No. 3,935,634 as indicated above. In this technique, a processed transducer 20 is placed on the top surface of the housing 40. The inner diameter A of the housing 40 defines the active region of the daiphragm. The wafer 20 is aligned with the housing such that the metal contacts 27 and 28 are located on the outside or above appropriate slots in the housing. An electrostatic bias is applied between the wafer 20 and the housing 40. The bias is obtained by means of a generator 50 or high voltage source capable of providing a voltage in excess of two hundred or more volts. The units are brought into contact under a temperature of between 200° to 400° F. which is below the melting point of the glass provided. A strong mechanical bond is provided between the glass housing and the semiconductor material. Since the semiconductor is completely flat, there are no pattern surface irregularities on the semiconductor surface which would affect the nature of the bond.

If one desires a more efficient bond, one could deposit a thin layer of metal such as aluminum uniformly on the substrate about the periphery thereof, which layer is above the terminal areas 17 and 19 and which areas are isolated from the metal ring by the semiconductor material.

Thus, FIG. 3 depicts one configuration which is accomodated by this technique. Other techniques are obvious to one skilled in the art but an essential point of the present invention is that one is assured of a flat surface with underlying terminals to which a secure bond can be easily made.

The transducer structure can be covered by a thin layer 51 of silicon dioxide if desired. In any event, by using the above described techniques, one employs ion implantation for the fabrication of terminal areas and hence, one does not have to provide elaborate resistance control, as these terminal areas need only provide a low resistance as compared to the effective resistance of the piezoresistors. This therefore enables the efficient coupling of a bias supply to the array and also enables one to respond to any voltage changes due to the application of an applied force to the transducer configuration. Thus, one maintains the ability to fabricate sensor arrays using prior art diffusion and epitaxial growth techniques to assure high quality piezoresistors. The use of ion implantation to form terminal areas enables one to provide an optimum bond to a glass or other type of housing, while maintaining a good hermetic seal as necessary. This is accomplished by the fact that the ion implant terminals do not interfere or effect the surface quality of the semiconductor structure to which the housing is bonded or secured to.

While the above noted technique depicted diaphrams of circular configuration, it is understood that any other geometrical shape could be employed. It is also understood that one can reinforce diaphragms by means of extending peripheral ridges and hence, provide diaphragm structures of various cross sections, which alternate structures are known in the prior art.

We claim:

1. A semiconductor transducer for responding to the magnitude of an applied force, comprising:
   a relatively thin diaphragm of a semiconductor material of a given cross section and having located in an active central area at least one piezoresistive sensor which is fabricated integrally with said diaphragm terminal areas connected to said piezoresistive sensor and buried within said diaphragm by ion implantation, with said terminal areas extending from said central area towards the periphery of said diaphragm, and with the resistance of said terminal areas being substantially lower than the resistance of said piezoresistive sensor and having a different temperature coefficient, and an annular housing coupled to said diaphragm with the central aperture of said housing surrounding said active area and with the sidewalls of said housing secured to said diaphragm beneath said terminal areas.

2. The semiconductor transducer according to claim 1 wherein said annular housing is fabricated from glass and secured to said diaphragm by an electrostatic bond.

3. The semiconductor transducer according to claim 1 further including metal contact terminals coupled to said terminal areas near the outer periphery of said diaphragm.

4. The semiconductor transducer according to claim 1 wherein said diaphragm is fabricated from silicon with said sensors diffused therein and isolated from said diaphragm by a PN junction.

5. The semiconductor transducer according to claim 1 wherein said terminal areas are between 0.1 to 1.0 micron thick as extending into said diaphragm.

6. The semiconductor transducer according to claim 1 wherein said sensors within said active area are covered by a layer of silicon dioxide.

7. The semiconductor transducer according to claim 1 wherein the resistance of said terminal areas is much lower than the resistance of any of said piezoresistors.

8. The semiconductor transducer according to claim 1 wherein said piezoresistive sensors form a Wheatstone bridge array having four piezoresistors.

9. The semiconductor transducer according to claim 8 wherein said transducer includes five terminal areas coupled to said array for biasing the same.

10. The semiconductor transducer according to claim 1 wherein said thin diaphragm is highly polished on both surfaces to provide a flat bonding surface.

* * * * *